Figure 1:
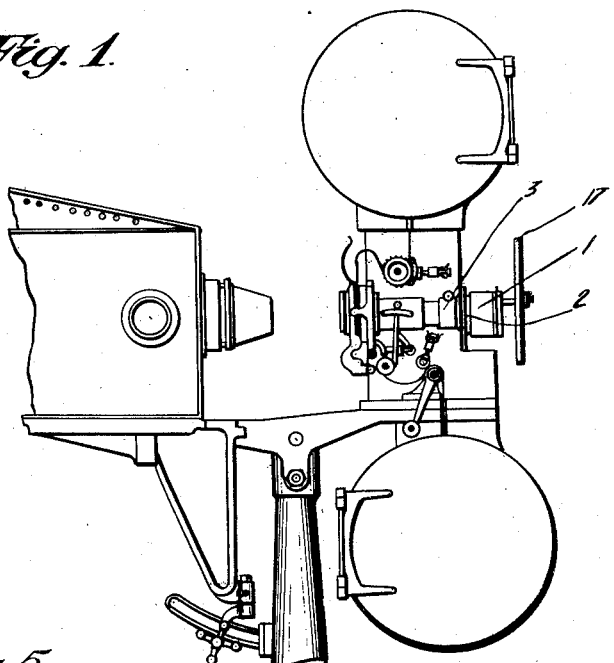

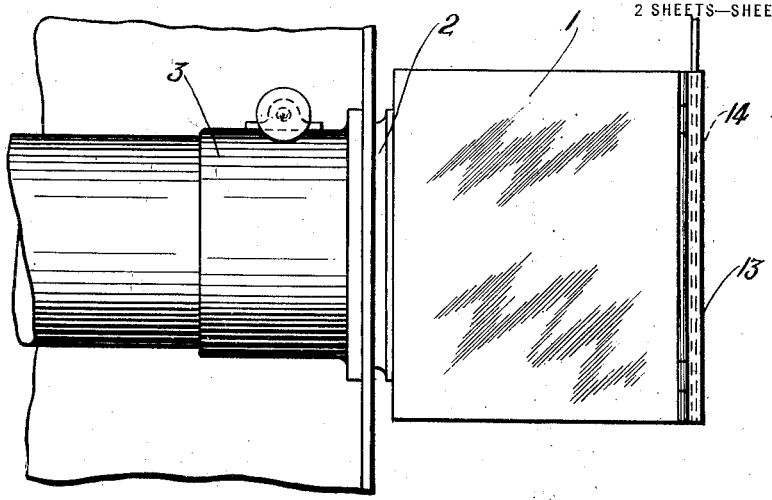
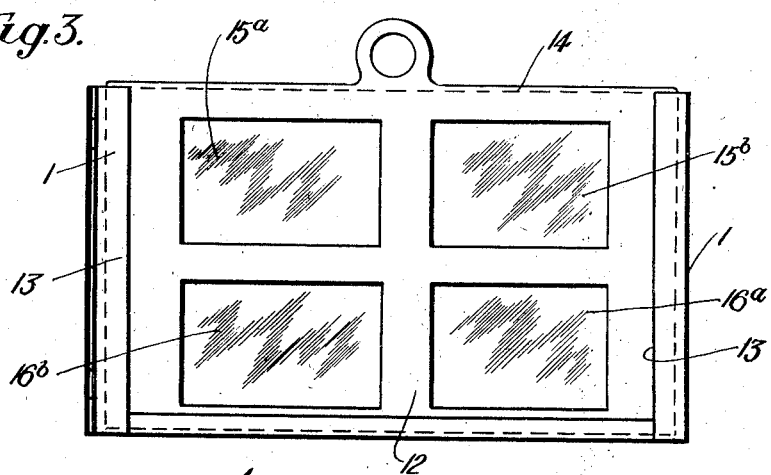
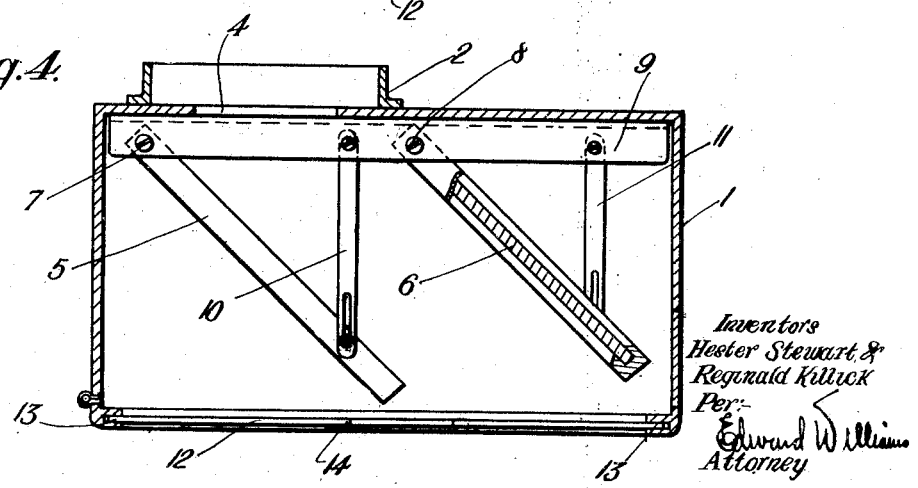

UNITED STATES PATENT OFFICE.

HESTER STEWART AND REGINALD KILLICK, OF LONDON, ENGLAND.

CINEMATOGRAPH COLOR PROJECTOR.

1,427,131. Specification of Letters Patent. Patented Aug. 29, 1922.

Application filed February 15, 1922. Serial No. 536,809.

*To all whom it may concern:*

Be it known that we, HESTER STEWART and REGINALD KILLICK, subjects of the King of Great Britain, both residing at London, England, have invented a new and useful Cinematograph Color Projector, of which the following is a specification, and for which we have filed an application in Great Britain bearing Serial Number 4,437 and dated February 7, 1921.

Our invention relates to an improved method for producing cinematograph pictures in natural colors. The primary object of this invention is to enable cinematograph pictures to be projected in natural colors by means of the ordinary projector used for monochrome pictures, and to enable a natural colored picture to be projected from a monochrome positive produced from a panchromatic negative which has been taken by any known method suitable for producing multi-color color records in recurring series.

Hitherto it has been proposed to project a two color image through a single lens by employing two reflecting mirrors one of which is transparent and permits the passage of a portion of the light and reflects the remainder to another non-transparent reflector so as to obtain duplicate images of one object. A rotary shutter having apertures at different radial distances from its centre has previously been employed for alternately cutting off each of a number of different colored images projected through separate projector lenses.

According to our invention, we employ apparatus capable of being temporarily or permanently attached to an ordinary monochrome cinematograph projector and by means of which attached apparatus the rays of light from the projector are split up into two or three separate beams only one of which is projected onto the screen at any given instant more particularly we employ a series of reflectors mounted in a suitable dust-proof reflector box suitably positioned in front of the projector lens and in the path of the rays of light. This reflector box is provided with a series of reflectors, hinged at one end and adjustably supported at the other in order that they may be adjusted angularly, so as to register or superimpose the images formed by the separate beams of light upon the screen.

Suitable color filters are positioned in front of the reflector box. The said filters may be mounted in a suitable slide or carrier so as to facilitate removal for cleaning, replacement of damaged filters, or the substitution of filters of other colors should the nature of the film require it. The color filters carried by the said holders being located in front of the reflector box are of course situated in the path of the beams of light coming from the reflectors and are traversed by the beams. These color filters may be composite in color, each filter comprising separate areas or portions of each of the colors employed, arranged so as to alternate in position with the other color filters, so that each picture produced upon the screen will be colored in areas or sections corresponding with the areas of each of the colors employed, and these two or three color sections will alternate in succeeding pictures.

A suitable shutter or shutters is or are arranged to cut off one or more images projected from each picture and permit each beam of light to produce a picture upon the screen. The shutter is arranged so that the images projected from succeeding pictures will pass through different color filters to produce different colored images upon the screen which follow each other in close succession with a minimum dark period between. An illustrative arrangement of shutter for this purpose may comprise a circular disc, having two or more concentric arc shaped openings or series of openings arranged at different radial distances and spaced at equal intervals apart. The disc is so mounted that when rotated at the speed destined for the specific film in use the arc shaped openings will permit the passage of each of the beams of light in turn. The shutter openings may be graduated by providing series of openings of gradually increasing circumferential length so as to cover and uncover the pictures more or less gradually, and these graded portions of the shutter openings may overlap each other to a limited extent. The smaller openings of this series may be said to "introduce" the covering and uncovering of the pictures to the next larger opening of the series and thus ultimately lead up or down to a full covering or uncovering of the pictures. This gradual action tends to prevent flickering of the projected picture and is a device well known in the art.

The individual components comprising each of the color filters may be graded or blended into each other, so that taking the case of a two color system, one filter may comprise a red screen fading through orange or yellow to green and blue-green, while the other filter is similar in character but reversed as to position. In this manner no perceptible junction is created between the two color sections of each filter and this color blending of the filter sections, when taken in conjunction with the introductional covering and uncovering of the picture as effected by the hereinbefore described flicker eliminating shutter will eliminate the objectionable "color-fringe" inherent to most two-color projection processes.

The film intended for projection is of the kind used in those processes of the multicolor cinematograph projection art which depend upon the phenomenon known as "persistence of vision" or more exactly the sustained perception of a changing image. Such film contains pictures or images which have been photographically or otherwise recorded in monochrome but in recurring series of alternating color values. Such film may for example be termed "positive monochrome color-record film." Many varieties of such film, produced by various processes and intended for the exhibition of cinematograph pictures in natural colors are available but each variety of film necessitates the use of a special costly and complicated projector suitable only for the particular type of film on hand and equipped with complicated mechanisms and color filters all constituting integral portions of the structure. It is the object of our invention to make it possible to satisfactorily project any and all varieties of the hereinbefore mentioned type of film by means of the ordinary cinematograph projector when such projector is equipped with the detachable apparatus constituting our invention. The filters and other parts of our apparatus may of course be readily changed to meet the color, speed and other conditions necessary for the proper projection of any given variety of color-record film. Separate images colored alternately in accordance with the color screen through which that portion of the negative was taken will thus be projected alternately on to the screen so as to produce a composite picture in natural colors to the eyes and therefore in the minds of the observer owing to the effect of the "persistence of vision" phenomenon hereinbefore mentioned.

In order that our invention may be more readily understood reference is made to the accompanying sheet of illustrative drawings, in which:—

Figure 1 is a side elevation of a standard type of projector fitted in accordance with our invention, Figure 2 is a side elevation of the reflector and filter box mounted upon the projector lens, Figure 3 is a front elevation of the same showing a suitable arrangement of sectioned color filter for use in two color projection.

Figure 5:
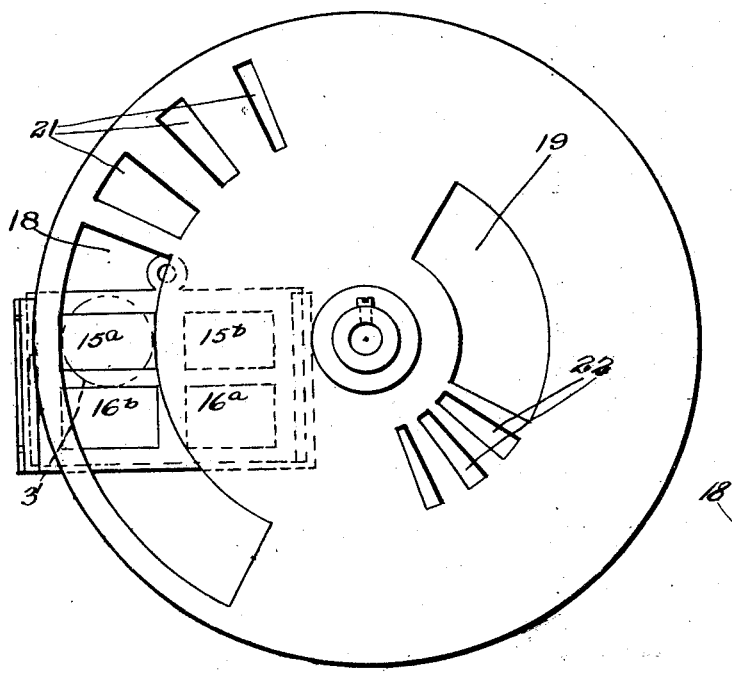
Figure 6:
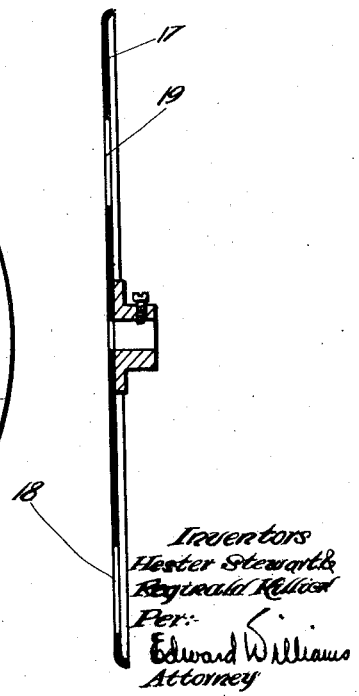

Figure 4 is a sectional plan of the reflector and filter box showing the manner in which the reflectors are mounted, and Figures 5 and 6 are respectively front elevation and vertical section of a suitable construction of composite shutter for two color work. It is of course understood that these designs are merely illustrative as applied to the type of film mentioned and that modifications may be embodied in the apparatus in order to make it suitable for use with other types of color-record film without departing from the spirit of our invention.

Referring to the drawings, we employ a reflector and filter box 1 comprising a suitable casing, having a collar 2, by means of which it may be supported upon the front of the projector lens 3. In the back of this reflector box 1 is provided an opening 4 through which the rays of light from the lens 3 pass into the filter box. In front of this aperture 4 is mounted a reflector 5 of a suitable character to enable a portion of the rays of light to pass directly through it, while the remainder of the rays are deflected at right angles on to a second reflector 6 arranged within the filter box 1. The reflector 5 may conveniently comprise a silvered mirror, in which portions of the surface are silvered and portions are left transparent. The silvered portions may be arranged in strips, dots or other convenient arrangement, and serve to reflect a portion of the light on to the reflector 6, while the remainder of the light passes directly through the transparent spaces. The light is thus split up into two separate beams so as to form separate images, which will be projected upon the screen in rapid succession with a minimum dark period between as hereinbefore described. In order to enable these two images to be registered correctly upon the screen and therefore in the eyes and mind of the observer, the reflectors 5 and 6 are hinged at 7 and 8 respectively, upon the support 9 in the filter box 1, and are supported at their opposite ends by slotted links 10 and 11. Clamping screws on the reflectors engage the slots in these links so that they may be adjusted about their pivots 7 and 8 to a suitable angle and then clamped to the slotted links 10 so as to be rigidly locked in position.

In the front of the filter box 1 is formed a large rectangular opening 12 and grooved slides 13 are provided at the sides, into which a filter frame 14 may be dropped, so as to be supported in front of the reflectors 5 and 6. This filter frame 14 is provided with two separate color filters 15ª, 15ᵇ, and 16ª and 16ᵇ. Each filter is formed in two sections, the section 15ª of which may for example be red while the section 15ᵇ may be blue-green. The other filter is similar but the red section 16ª is at the right and the blue green section 16ᵇ at the left, that is the reverse to the other filter 15ª and 15ᵇ.

Each picture is split up into two images which are projected through the blue-green color filter 15ᵇ and the red color filter 15ª respectively. A rotary shutter 17 is provided to alternately cut off the rays of light passing through the filters 15ª and to permit the passage through the other filter 15ᵇ and vice versa. For this purpose two concentric arc shaped openings 18 and 19 are arranged at different distances from the centre of the shutter and positioned diametrically opposite to each other. The shutter 17 is mounted to rotate in front of the filter box, so that the arc shaped opening 18 will allow the image projected through the filter 15ª to be projected upon the screen, and as the shutter 17 is rotated these images will be cut off and the segmental opening 19 will permit the images projected through the filter 15ᵇ to be projected on to the screen in their turn. These two sets of images will register one with another in the eyes and mind of the observer so as to produce a composite natural color picture. The blank portions 20 of the shutter 17 serve to mask the picture while the film is being moved and thus produce the "minimum dark period" hereinbefore mentioned. At one end of the openings 18 and 19 are shown the graduated slots 21 and 22 which in combination with the graduated filter eliminate flicker and color-fringe. This shutter is geared so as to be driven at the required speed so that the openings 18 and 19 will alternately permit the passage of images through the filters 15ª and 15ᵇ respectively. With a two segment shutter this would require to be geared so as to revolve one revolution for each two picture movements. The alternative set of color filters 16ª and 16ᵇ are arranged with the red filter 16ª and the blue-green filter 16ᵇ in the reverse position and are employed to obviate excessive movement of the masking apparatus when the film does not register properly in the gate.

The positive color record monochrome film employed in the projector may be prepared in any known manner from a color-value negative taken by any suitable method used for producing multi-color records in recurring series. The choice of color filters used during the projection of the positive screen image is of course governed by the color filter conditions prevailing during the taking of the original color-record negative.

We claim:—

1. An apparatus for color cinematograph projection comprising a projector, means mounted in optical relation to the projector lens for dividing rays of image-bearing light into a plurality of beams, a color filter in the path of each beam, and movable means in operative relation to said projector for gradually interrupting said beams in predetermined alternate succession, said filters being colored to correspond to the color conditions prevailing during the filming of the picture.

2. In an apparatus for color cinematograph projection, the combination with a projector of detachable means in operative relation with said projector for dividing rays of light of the image to be projected into a plurality of beams in registering relation, separate color filters in the paths of said beams, and movable means in operative relation to said filters for gradually interrupting the emerging images in alternate succession.

3. In an apparatus for color cinematograph projection, the combination with a projector of means situated in front of the projector lens for dividing rays of image-bearing light into a plurality of beams, separate color filters in the paths of said beams, and movable means in operative relation with said filters for gradually interrupting the emerging images in predetermined alternate succession.

4. Apparatus for color cinematograph projection comprising a projector, a light-transmitting reflector and a non-transmitting reflector in operative optical relation to the projector lens for dividing rays of image-bearing light into a plurality of beams, a color filter in the path of each beam and movable means in operative relation to said projector for interrupting said beams in alternate succession.

5. Apparatus for color cinematograph projection comprising a projector, a transmitting reflector, a plurality of light-transmitting reflecting surfaces disposed on said reflector and a non-transmitting reflector in operative optical relation to the projector lens for dividing rays of image-bearing light into a plurality of beams, a color filter in the path of each beam, and movable means in working relation to said projector for interrupting said means in alternate succession.

6. Apparatus for color cinematograph projection comprising a projector, a light-transmitting reflector and a non-transmitting reflector in operative optical relation to the projector lens for dividing rays of image-bearing light into a plurality of beams, retaining means for said reflectors, angularly adjustable pivotal beam-registering means for said reflectors, a color filter in the path of each beam, retaining means for said filters, positioning means for said retaining means, and movable means in operative relation to said projector for interrupting said beams in alternate succession.

7. Apparatus for color cinematograph projection comprising a projector, a light-transmitting reflector and a non-transmitting reflector in operative optical relation to the projector lens, for dividing rays of image-bearing light into a plurality of beams, retaining means for said reflectors, angularly adjustable pivotal beam-registering means for said reflectors, a color filter in the path of each beam, retaining means for said filters, positioning means for said retaining means and movable means for interrupting said beams in alternate succession.

8. Apparatus for color cinematograph projection comprising a projector, a light-transmitting reflector and a non-transmitting reflector in operative optical relation to the projector lens for dividing rays of image-bearing light into a plurality of beams, retaining means for said reflectors, angularly adjustable pivotal beam-registering means for said reflectors, a color filter in the path of each beam, retaining means for said filters in working relation to said reflectors, positioning means for said filter retaining means and movable means for interrupting said beams in alternate succession.

9. Apparatus for color cinematograph projection comprising a projector, means in working relation to said projector for dividing rays of image-bearing light into a plurality of beams, a color filter in the path of each beam, a rotatable shutter and a series of arcuate openings in said shutter arranged at equal angular distances around said shutter at different radial distances from the center, for interrupting said beams in alternate succession.

10. Apparatus for color cinematograph projection comprising a projector, a light-transmitting reflector and a non-transmitting reflector in operative optical relation to the projector lens for diving rays of image-bearing light into a plurality of beams, a color filter in the path of each beam, a rotary shutter and a series of arcuate openings in said shutter disposed at equal angular distances around said shutter and at different radial distances from the center for interrupting said beams in alternate succession.

11. Apparatus for color cinematograph projection comprising a projector, a light-transmitting reflector and a non-transmitting reflector in operative optical relation to the projector lens, for dividing rays of image-bearing light into a plurality of beams, retaining means for said reflectors, angularly adjustable pivotal beam-registering means for said reflectors, a color filter in the path of each beam, retaining means for said color filters, positioning means for said retaining means, a rotary shutter, a plurality of arcuate openings at equal angular distances around said shutter at different radial distances from the center of said shutter for interrupting said beams in alternate succession.

12. Apparatus for color cinematograph projection comprising a projector, a light-transmitting reflector and a non-transmitting reflector in operative optical relation to the projector lens for dividing rays of image-bearing light into a plurality of beams, retaining means for said reflectors, angularly adjustable pivotal beam-registering means for said reflectors, a plurality of sets of color filters, retaining means for said filters, positioning means for said retaining means, a rotary shutter in operative relation to said projector, a series of arcuate openings at equal angular distances around said shutter at different radial distances from its center, for interrupting the said beams in alternate succession.

13. Apparatus for color cinematograph projection comprising a projector, a light-transmitting reflector and a non-transmitting reflector in operative optical relation to the projector lens, for dividing rays of image-bearing light into a plurality of beams, retaining means for said reflectors, angularly adjustable pivotal beam-registering means for said reflectors, a plurality of sets of separate color filters, retaining means for said filters, positioning means for said retaining means, a rotary shutter in operative relation to said projector, a plurality of arcuate openings at equal angular distances on said shutter at different radial distances from the center, for interrupting said beams in alternate succession.

14. Apparatus for color cinematograph projection comprising a projector, means in operative optical relation to the projector lens for dividing rays of image-bearing light into a plurality of beams, a color filter in the path of each beam, a rotary shutter in operative relation to said shutter, a plurality of arcuate openings at equal angular distances around said shutter at different radial distances from the center, and a plurality of apertures on said shutter in graduated introductional relation to said arcuate openings for interrupting said beams in alternate succession.

15. Apparatus for color cinematograph projection comprising a projector, a light-transmitting reflector and a non-transmitting reflector in operative optical relation to the projector lens, for dividing rays of image-bearing light into a plurality of beams, a color filter in the path of each beam, a rotary shutter in working relation to said projector, a plurality of arcuate openings at equal angular distances around said shutter and at different radial distances from the center and a plurality of apertures on said shutter in graduated introductional relation to said arcuate openings for interrupting said beams in alternate succession.

16. Apparatus for color cinematograph projection comprising a projector, a light-transmitting reflector and a non-transmitting reflector in operative optical relation to the projector lens, for dividing rays of image-bearing light into a plurality of beams, retaining means for said reflectors, angularly adjustable pivotal beam-registering means, a plurality of color filters, retaining means for said filters, positioning means for said retaining means, a rotary shutter in operative relation to said projector, a plurality of arcuate openings at equal angular distances on said shutter at different radial distances from the center, and a plurality of apertures on said shutter in graduated introductional relation to said arcuate openings for covering and uncovering said beams in alternate succession.

17. Apparatus for color cinematograph projection, comprising a projector, a light-transmitting reflector and a non-transmitting reflector in operative optical relation to the projector lens, for dividing rays of image-bearing light into a plurality of beams, retaining means for said reflectors, angularly adjustable pivotal beam-registering means for said reflectors, a plurality of color filters, retaining means for said filters, positioning means for said retaining means, a rotary shutter in operative relation to said projector, a plurality of arcuate openings at equal angular distances around said shutter at different radial distances from the center, and a plurality of apertures on said shutter in graduated introductional relation to said arcuate openings for interrupting said beams in alternate succession.

18. Apparatus for color cinematograph projection comprising a projector, a light-transmitting reflector and a non-transmitting reflector in operative optical relation to said projector lens, for dividing rays of image-bearing light into a plurality of beams, retaining means for said reflectors, positioning means for said retaining means, a rotary shutter in operative relation to said projector, a plurality of arcuate openings at equal angular distances around said shutter and at different radial distances from the center, and a plurality of apertures on said shutter in graduated introductional relation to said arcuate openings for interrupting said beams in alternate succession.

19. Apparatus for color cinematograph projection comprising a projector, a light-transmitting reflector and a non-transmitting reflector in operative optical relation to the projector lens, for dividing rays of image-bearing light into a plurality of beams, retaining means for said reflectors, angularly adjustable pivotal beam-registering means for said reflectors, a plurality of sets of color filters, retaining means for said filters, positioning means for said retaining means, a rotary shutter in operative relation to said projector, a plurality of arcuate openings at equal angular distances around said shutter, at different radial distances from the center, and a plurality of apertures on said shutter in graduated introductional relation to said arcuate openings for interrupting said beams in alternate succession.

HESTER STEWART.
REGINALD KILLICK.